United States Patent [11] 3,594,716

[72] Inventor Glenn N. Waterman
 Salt Lake City, Utah
[21] Appl. No. 818,893
[22] Filed Apr. 24, 1969
[45] Patented July 20, 1971
[73] Assignee Edo Western Corporation
 Salt Lake City, Utah

[54] ELECTRONIC DOCKING GUIDANCE SYSTEM
 17 Claims, 15 Drawing Figs.
[52] U.S. Cl. .................................................... 340/3 D
[51] Int. Cl. ..................................................... G01s 9/66
[50] Field of Search .......................................... 340/3, 3 D

[56] References Cited
UNITED STATES PATENTS
3,337,840 8/1967 Turner .......................... 340/3

Primary Examiner—Richard A. Farley
Attorney—Davis, Hoxie, Faithfull & Hapgood

ABSTRACT: A vessel docking system employs transmitting and receiving transducers for developing Doppler frequency shifted signals indicative of velocity components along particular ship's axes. The signals are converted to digital form, and processed to yield speed and direction information along the sensed axes. The velocity information is corrected to compensate for variations in the acoustical propagating characteristic of the ocean medium.

PATENTED JUL 20 1971

INVENTOR.
GLENN NOBLE WATERMAN
BY
Davis, Hoxie, Faithfull & Hapgood
ATTORNEYS

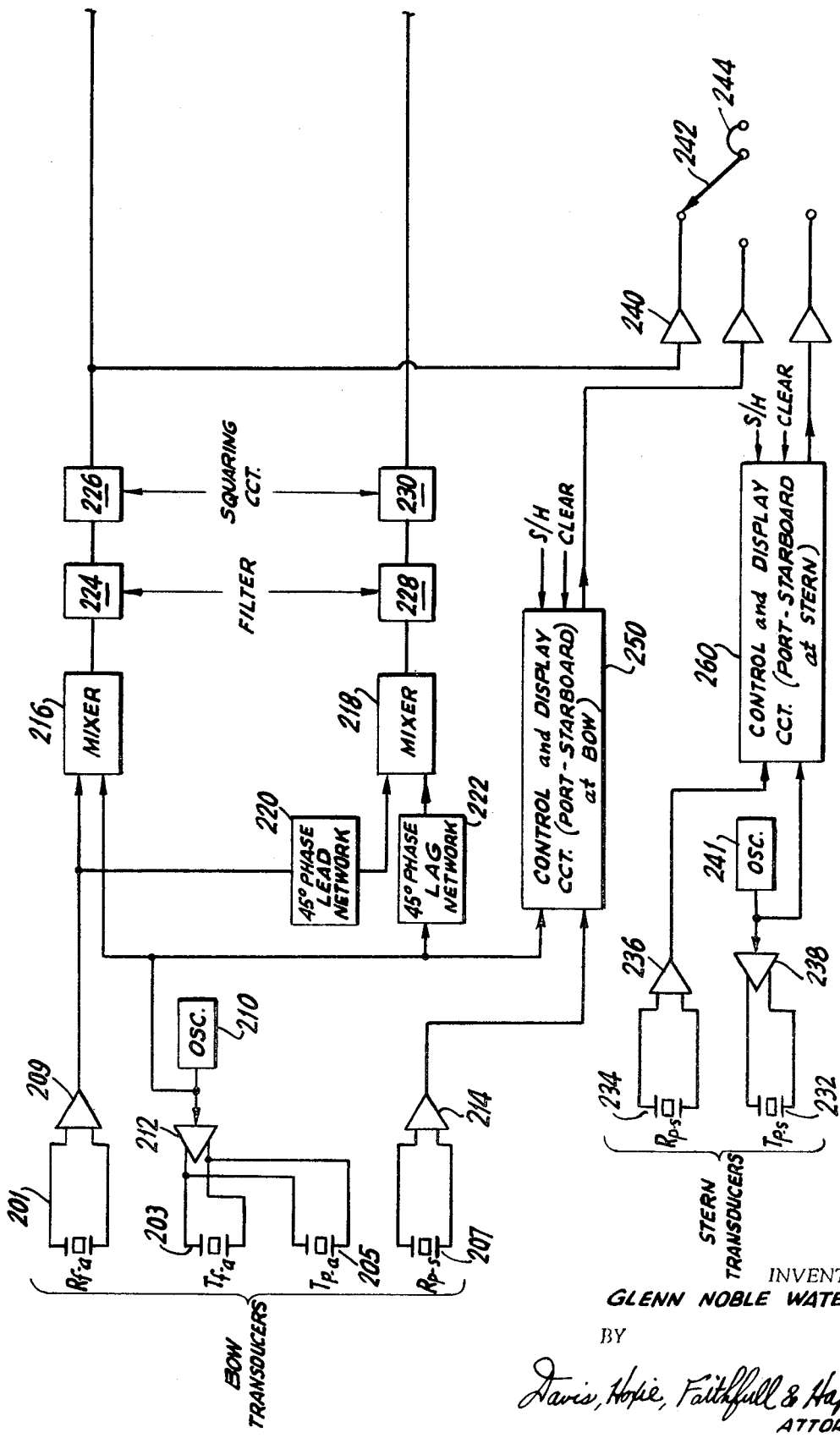

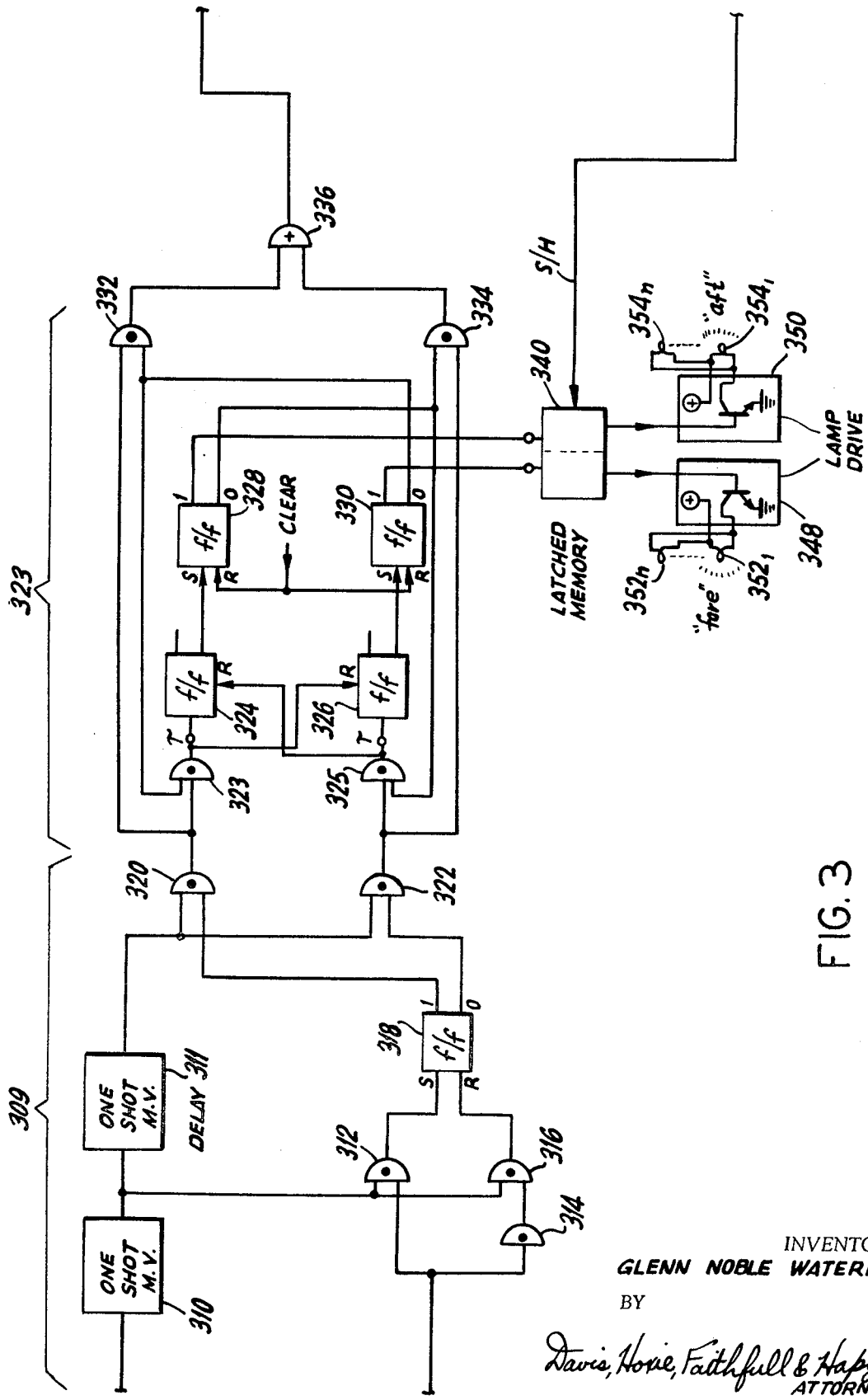

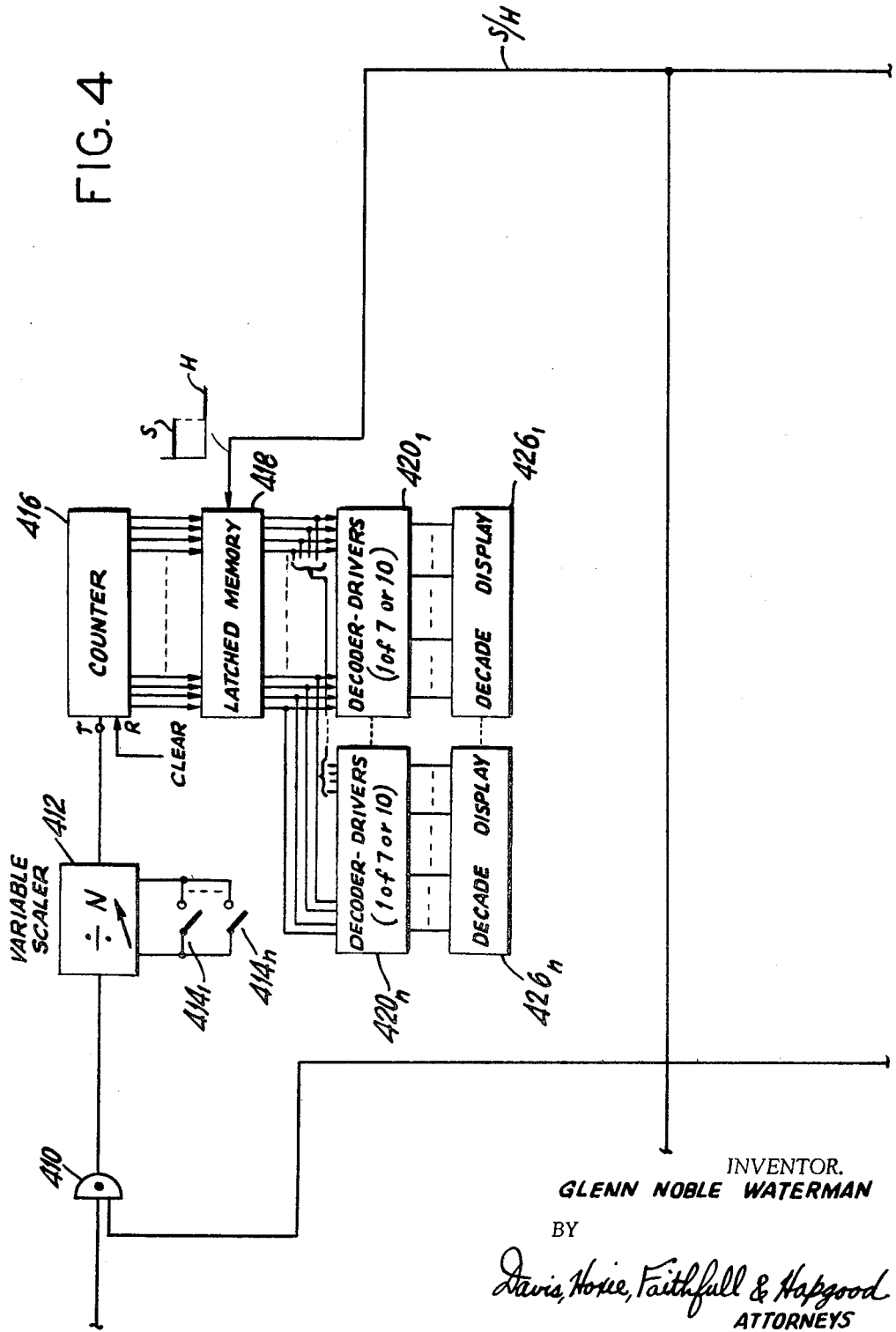

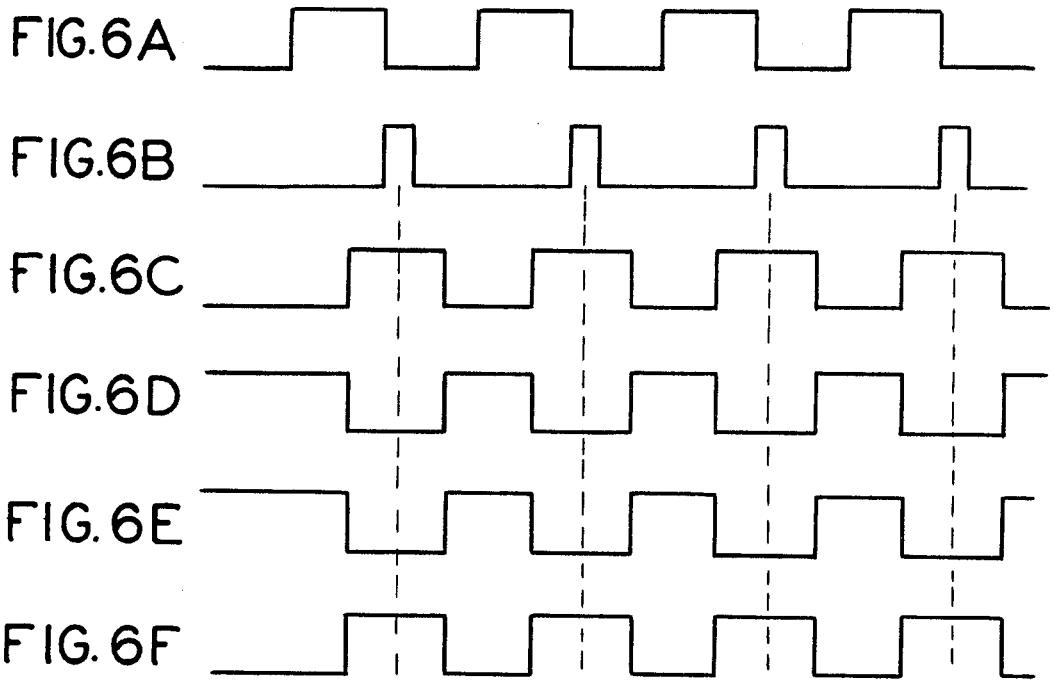
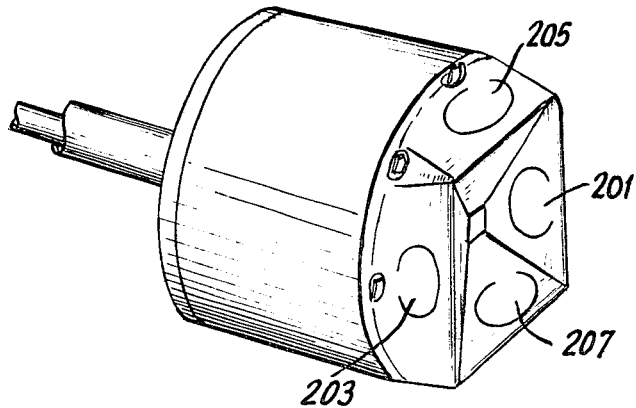
FIG. 7

ELECTRONIC DOCKING GUIDANCE SYSTEM

This invention relates to electronic guidance systems and, more specifically, to a ship docking system employing the Doppler "apparent frequency shift" principle.

With the advent of tanker vessels in the three hundred thousand deadweight ton and above class, it has become necessary to provide a docking system which accurately displays the ship fore-aft and port-starboard speed during docking. Unless the tanker approaches a docking facility with an extremely low absolute velocity in all directions, the dock and ship may suffer severe damage because of the extremely large momentum of even a slowly moving ship. Further, the speed must be carefully identified and controlled during the entire docking operation since tankers of this physical size and inertia have a very large turning radius and stopping path length.

By way of further requirements, the docking system must be operative to display absolute ship's velocity in a moving current, and in adverse weather conditions.

Such a system for displaying absolute forward and lateral velocity has applications distinct from tanker docking. For example, velocity information is important where a ship is hovering over a fixed point on the ocean bottom as for exploration, construction or demolition, or where carefully controlled navigation is required, e.g., when operating in a narrow or precarious channel or in mine sweeping operations.

It is an object of the present invention to provide an improved marine guidance system.

More specifically, an object of the present invention is the provision of a continuous wave Doppler docking system which employs digital circuitry for accurately and reliably displaying the instantaneous fore-aft speed of a vessel, and for independently displaying the port-starboard speed at the bow and stern of the ship.

The above and other objects of the present invention are realized in a specific, illustrative docking system employing three essentially independent channels for measuring and displaying fore-aft speed, and port-starboard speed at the bow and stern. Each channel includes a transducer for continuously transmitting sinusoidal energy directed at the ocean bottom along an associated sensing axis, and a receiving transducer for generating an electrical output responsive to a returned portion of the transmitted signal reflected by the ocean bottom. If the ship has any motion along the axis being examined, there will be an apparent increase or decrease in frequency of the return signal.

The emitted and return signals are mixed, converted to digital form, and processed to identify the particular direction of motion, if any, along the associated axis. Further, circuitry is provided to develop a sequence of pulses characterized by a repetition rate dependent upon the apparent Doppler frequency shift. A counter is employed to count the number of velocity-indicating pulses occurring within a repetitive gating time period which is corrected for variations in the temperature and salinity of the water, these parameters being factors in the frequency shifting process. The pulses accumulated during the periodically recurring time gate intervals are a direct measure of absolute axial velocity, and are converted to appropriate output displays which may be spaced about the ship. Similar displays are provided for all ship velocity components under study.

The above and other objects, features and advantages of the present invention are realized in a specific, illustrative embodiment thereof, presented hereinbelow in conjunction with the accompanying drawing, in which:

1A and 1B are orthogonal views respectively depicting fore-aft and port-starboard energy radiation and reflection paths;

FIGS. 2 through 5 depict an illustrative Doppler docking system embodying the principles of the present invention;

FIGS. 6A through 6F are timing diagrams depicting the voltage waveforms associated with the system of FIGS. 2—5;

FIG. 7 illustrates one embodiment of a transducer array employed in the system of FIGS. 2—5;

Figure 1B:
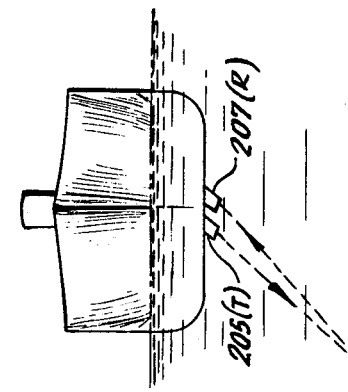
Figure 1A:
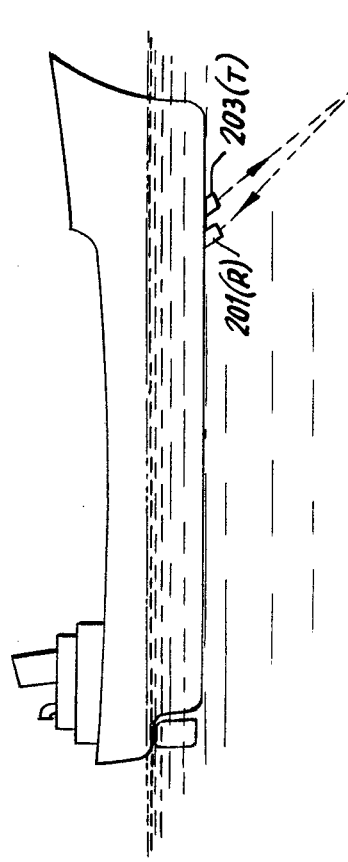

In accordance with the principles of the present invention, the velocity of a ship fore or aft, and port or starboard at its bow and stern is developed by digitally processing Doppler "apparent" frequency shifted signals. To this end, a transducer 203 (FIG. 1A) is employed under the ship's bow portion and oriented to radiate energy forward and downward along the fore-aft axis. The radiated energy may illustratively comprise a sinusoid having a relatively high frequency such as 455 k.c. to ensure operation for all types of sea floors, and with a good depth capability. A part of the emitted energy is scattered and reflected by the ocean bottom. A companion, like-oriented transducer 201 at the ship's bow is adapted to receive a portion of the reflected energy, and to convert it into electrical form.

As is well known, there is an apparent frequency shift of a signal transmitted between two points having a relative motion therebetween. In the instant application, the frequency of the signal received by the transducer 201 ($f_r$) will be higher than that emitted by the transducer 203 ($f_o$) if the ship has a forward velocity component, and smaller than $f_o$ if the ship is moving astern. In particular, and to a very good approximation at the relatively slow speeds associated with docking, the Doppler frequency shift $f_r - f_o$ is directly proportional to the ship's forward velocity and inversely proportional to the propagational speed of the emitted and returned wave through the water. Thus, by proper scaling of the system, the frequency difference $f_r - f_o$ yields a direct measure of the ship's speed when the system is corrected for variations in the acoustical wave propagation speed of water in the manner discussed below.

Similarly, there are transmitting and receiving transducers 205—207 (FIG. 2) oriented to port and downward at the bow to measure the port-starboard velocity components at that point. Similarly, transducers 232 and 234 are located at the stern to measure port-starboard speed there.

The transducers 201, 203, 205 and 207 at the bow may comprise individual units aligned as described above or, alternatively, four transducer elements mounted on a single pod as shown in FIG. 7. For the pod array, the receiving transducers 201 and 207 are mounted at right angles to each other about the inside portion of the pod, and the transmitters 203 and 205 are similarly aligned about the outer portion of the pod. Associated transducers 201 and 203, and 205 and 207 have parallel axes, and are separated from spurious direct coupling by a plate member.

Figure 8:
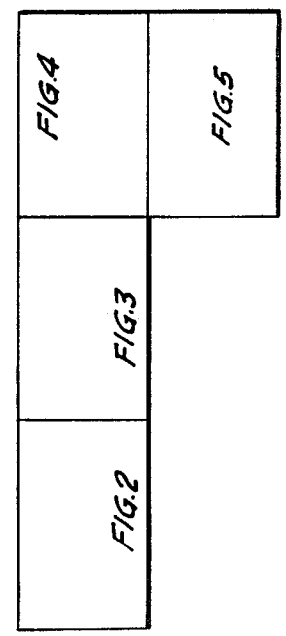
FIG. 8 illustrates the spatial organization of FIGS. 2—5.

Referring now to FIGS. 2—5, arranged as in FIG. 8, there is shown an electronic system for developing the requisite velocity information employing the above-described Doppler frequency shifting principles. The arrangement includes an oscillator 210 (FIG. 2) for imparting sinusoidal energy to the bow fore-aft and port-starboard transmitting transducers 203 and 205. Examining the signal flow and processing associated with fore-aft velocity, which is illustrative of the computational operation for the other two speed measurements, the sinusoid emitted by the transducer 203 is directed forward toward the ocean bottom, and is in part reflected back and recovered by the receiving transducer 201. Depending upon the motion of the ship, the signal frequency generated by the transducer 201 is either greater than, less than, or the same as that emitted by the transducer 203.

The return signal from the transducer 201 is amplified in a unit 209 and passes therefrom as one input to a mixer 216, and also passes via a 45° phase shifting lead network 220 to a mixer 218. A measure of the output from the oscillator 210 is directly supplied as a second input to the mixer 216, and supplied to an input port of the mixer 218 via a 45° phase lag network. Since the frequencies supplied to the lead and lag networks 220 and 222 are constrained to a very narrow range, these networks may simply comprise passive resistive and capacitive impedances. Filters 224 and 228 are connected to the outputs of the mixers 216 and 218, and comprise low-pass filters to select and pass therethrough only the first order difference frequency $f_r-f_o$ of the many sum and difference products generated by the nonlinear mixers 216 and 218. Thus, the outputs of the filters 224 and 288 are sinusoids of a Doppler difference frequency $f_r-f_o$ which are a direct measure of the fore-aft velocity component of the ship. However, the phase of the output signals from the filters 224 and 228 differs, with the sinusoid at the output of the filter 228 lagging the output of the filter 224 by 90 electrical degrees if $f_r$ exceeds $f_o$ (vessel moving ahead), and leading by 90° if $f_o$ exceeds $f_r$ (vessel heading astern).

The outputs from the filters 224 and 228 are respectively supplied to squaring circuits 226 and 230 which transform the input sinusoidal waveform to digital, or square wave form for subsequent digital processing. The squaring circuits may comprise, for example, threshold Schmitt trigger embodiments. The nonphase-shifted, reference output from the squaring circuit 226 is shown in FIG. 6A and the output of the squaring circuit 230 is shown in FIG. 6C (90° phase lag for motion ahead) and 6E (90° phase lead for motion astern).

The frequency of the square wave present at the output of the squaring circuit 226 (or the equivalent square wave frequency at the output of the element 230) is a direct measure of the Doppler frequency shift, and thus of ship's speed. A pair of headphones 244 may be connected under operator control by a switch 242 to the circuit 226 through an audio amplifier 240. The pitch of the audio reproduced by the phones 244 supplies a quick and easily discernible indication of the ship's fore-aft speed to an operator primarily focusing his attention elsewhere, e.g., upon piloting activities.

The audio indication approximates the absolute fore-aft velocity of the ship, uncorrected for changes in the ocean wave propagating characteristic, and without supplying forward viz-a-viz aft information. Circuitry 309 (FIG. 3) is provided to digitally identify a ship's motion as being ahead or astern, and includes a one-shot multivibrator 310 which is adapted to supply a pulse (FIG. 6B) at each trailing edge of the square wave supplied by the squaring circuit 226. The pulse output of the one-shot multivibrator 310 partially enables two AND gates 312 and 316 during a relatively short sampling interval once during each cycle of the square wave supplied by the circuit 226. The phase shifted square wave output of the squaring circuit 230 (FIG. 6C for motion ahead and FIG. 6E for motion astern) is directly supplied as a second input to the AND gate 312 and via an inverter 314 to a second input of the AND gate 316 FIGS. 6D-ahead and 6F-astern).

If the ship is moving ahead, the AND gate 312 will be fully energized and switched once each square wave cycle since both of its inputs will be at a relatively high voltage condition during the relatively high voltage sampling output of the one-shot multivibrator 310 FIGS. 6B and 6C). For this condition, the AND GATE 316 will not switch since the output of the inverter 314 (FIG. 6D) is always low during the gating interval. Accordingly, the fully enabled AND gate 312 energizes the set terminal of a flip-flop 318, and the relatively high voltage at the "1" output of the flip-flop 318 continuously energizes one input of an AND gate 320. The pulse output from the one-shot multivibrator 310 is supplied to a second input of the AND gate 320 via a delay element 311, and also to an AND gate 322. With the flip-flop 318 in the set condition, a delayed replica of the output from the one-shot multivibraotor 310 is developed once each cycle at the Doppler difference frequency rate. These pulses fully enable the gate 320 which thus has alike pulse train at the output thereof. Thus, the output of the AND gate 320 comprises a sequence of pulses having a repetition rate which is a direct measure of the velocity of the ship in the forward direction.

With the ship moving ahead, the flip-flop 318 is set and the unenergized "0" output thereof disables the AND gate 322 which is thus inhibited from switching. When the ship moves astern, the output of the squaring circuit 230 lags the reference wave from the circuit 226 by 90° (FIG. 6E). Accordingly, when this condition obtains, the gate 316, supplied with the inverted replica of the phase advanced square wave (FIG. 6F), is fully enabled and drives the flip-flop 318 to a reset condition. The "1" and "0" outputs from the flip-flop 318 respectively disable and partially enable the AND gates 320 and 322, thus permitting only the AND gate 322 to pass the rearward velocity indicating pulses supplied by the one-shot multivibrator 310 and the delay 311. Hence, pulses are developed at the output of the AND gate 322 when the ship is moving astern and at the output of the AND gate 320 when the ship is moving ahead.

The outputs from the AND gates 320 and 322 are supplied to circuitry 323 which is provided for reliability considerations, i.e., to require that two consecutive pulses be supplied from the output of either the gate 320 or 322 before a "fore" viz-a-viz "aft" indication is displayed. Assuming that the vessel is traveling ahead, repetitive pulses appear at the output of the AND gate 320 and not at the output of the gate 322. A flip-flop 324 is provided to count the output pulses from the AND gate 320 through a normally enabled AND gate 323 and responsive to the second such pulse, the flip-flop 324 sets a flip-flop 328. The "0" output of the set flip-flop 328 thus exhibits a low voltage which blocks switching of an AND gate 334 thereby inhibiting any spurious "aft-motion" indicating pulses spuriously developed at the output of the AND gate 322 from reaching an OR gate 336 and subsequent processing apparatus. Further, the low voltage at the "0" output of flip-flop 328 disables an AND gate 325 to effectively isolate erroneous pulses from the verifier and direction designating circuitry 323. Thus, responsive to the requisite two output pulses from the gate 320, spurious rearward velocity pulses are inhibited from having any electrical effect.

The AND gates 323 and 325 are adapted to reset the pulse counting flip-flops 326 and 324, respectively, if the incoming pulses alternate between fore and aft indications. Once the requisite two consecutive direction signaling pulses have been received, one of the gates 323 or 325 is inhibited from any further effect by the low voltage output from the flip-flop 330 or 328.

The flip-flop 328, like a corresponding flip-flop 330, initially resides in a reset condition. Thus, the "0" output from the flip-flop 330 is initially high and partially enables an AND gate 332 which therefore passes all forward velocity indicating pulses generated at the output of the AND gate 320. These forward motion pulses are passed through the OR GATE 336 for eventual counting and velocity measurement.

Correspondingly, if the boat is moving astern, a flip-flop 326 counts two output pulses from the gate 322 via a normally operative AND gate 325 and sets the flip-flop 330, thereby disabling the AND gate 332 from passing any spurious forward motion indicating pulses. Further, the "0" output of the flip-flop 328 remains high and partially enables the AND gate 334, thereby passing the astern velocity indicating pulses from the gate 322 to and through the OR gate 336. The set flip-flop 330 also blocks the AND gate 323 to cut off the flow of any spurious forward pulses developed by the gate 320.

The output of the OR gate 336 comprises a sequence of pulses having a repetition rate which identifies the velocity component of the vessel along the sensed axis, whether forward or astern. An increasing repetition rate for pulses supplied by the OR gate 336 identifies increased ship's speed (either forward or astern), and vice versa.

The direction of travel of the ship is indicated by an illuminated one of two lamp groups 352 or 354 which are respectively energized by lamp drivers 348 or 350 when the ship is traveling fore or aft. One pair of lamp groups 352 and 354 are included in each output display. Control for the lamp drivers 348 and 350 is derived from the "1" outputs from the flip-flop 328 and 330 acting through a memory 340, with the "1" output of the flip-flop 328 being high if the ship is traveling ahead and the "1" output of the flip-flop 330 being high if the ship is traveling astern as discussed above. The two-stage latched memory 340 receives as inputs the outputs of the flip-flops 328 and 330, and also a control signal which selectively constrains the memory 340 to operate in a sample (track) or hold (store) mode. More specifically, the outputs of the latched memory 340 will follow and reproduce the data input signals when the memory is in a sample mode (a high "sample" input control voltage) and will retain the last sampled input voltages when the control signal becomes a relatively low (hold) voltage. The outputs from the memory 340, in turn, illuminate only one of the lamp groups 352 or 354 depending upon the state of the flip-flops 328 and 330 at the critical control voltage transition from a sampling to a hold voltage level.

The velocity magnitude indicating pulses present at the output of the OR gate 336 pass through a normally enabled AND gate 410 (FIG. 4) to a pulse frequency dividing scaler network 412 which illustratively comprises a digital counter having a signal output from the most significant digit stage thereof. In accordance with standard known techniques, a plurality of parallel-connected switches $414_1$ through $414_n$ are employed to alter the counter capacity when any one or more of the switches is closed. The switches 414 are normally distributed with the output information displays at various points about a vessel to provide for control at any of these points.

The variable scaler 412 is adapted to reduce the rate of Doppler difference frequency pulses to provide an output display in conventional engineering units (knots, feet per second or the like). As discussed below, the output display is generated by counting the number of divided pulses which occur in a corrected, cyclical time span, e.g., approximately 1 second. Thus, the scaler 412 wired for a first count capacity may be operative to divide down the Doppler difference frequency such that each pulse at its output may effectively represent a forward-aft velocity of 1 foot per second for the nominal 1-second gating interval or, with a switch 414 closed to change the scaler count capacity, a speed of one-tenth of a knot. The pulse output of the scaler 412 is supplied to the count input of a digital counter 416, typically of a binary coded decimal configuration.

Figure 5:
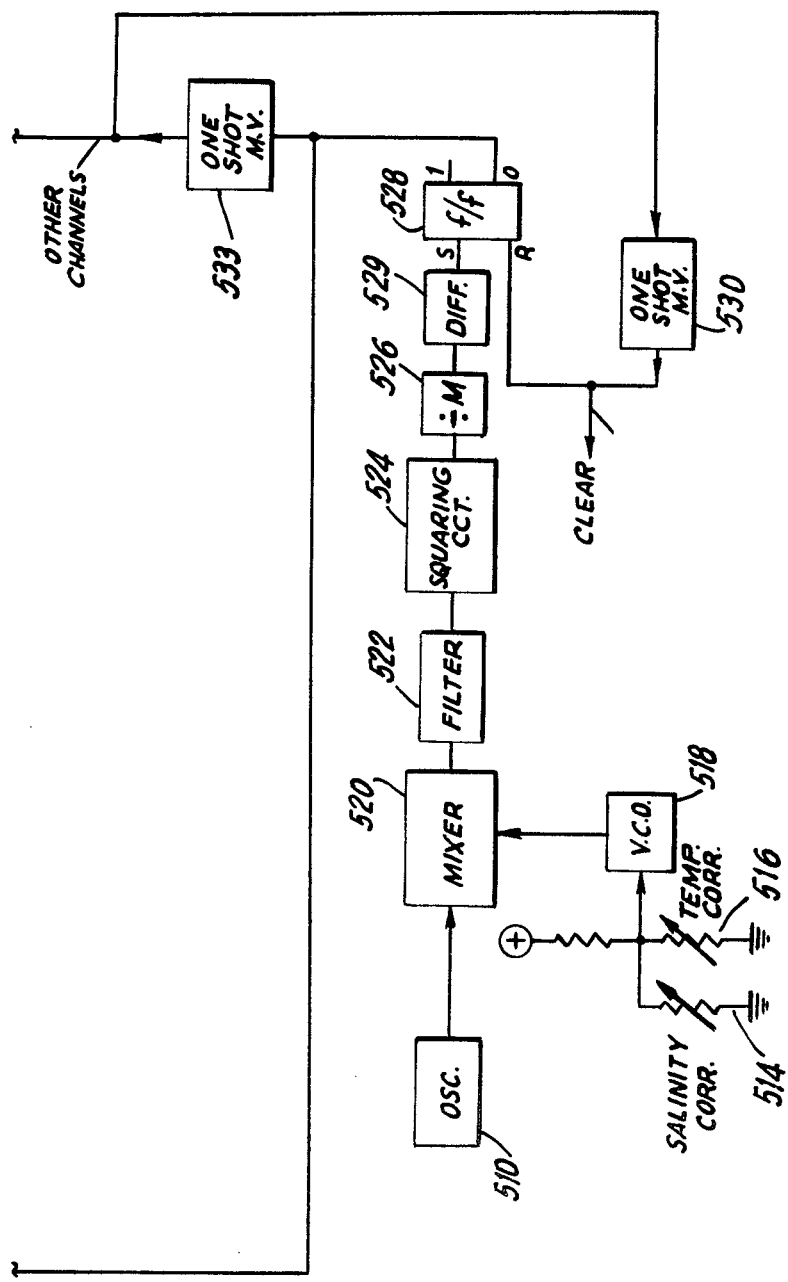
Figure 9:
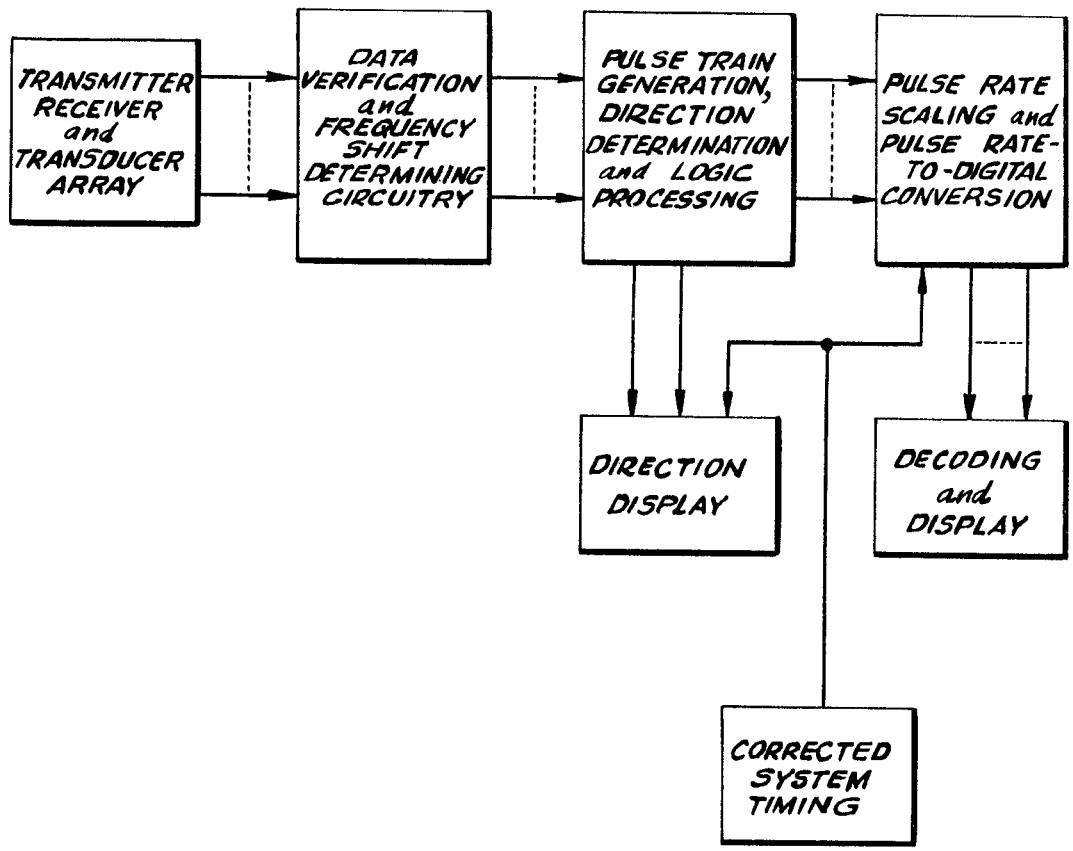
FIG. 9 depicts the subject Doppler docking system in block diagram form.

Circuitry for developing periodic sample/hold and CLEAR signals to cyclically examine (sample) and reset the counter 416 for converting the continuum of Doppler difference pulses into a velocity indicating cyclic accumulation is shown in FIG. 5. The apparatus of FIG. 5 is operative in conjunction with the count capacity of the scaler 412 to provide a counter pulse accumulating interval such that the peak count state of the counter 416 supplies a direct indication of a particular component of ship's velocity. This gating interval has some nominal value, e.g., 1 second, which is corrected to offset the inverse dependence of the Doppler difference frequency upon the propagation velocity of sound in water. Accordingly, the circuitry of FIG. 5 is adapted to take the salinity and temperature of the ocean into account since these are the principal factors in the change of acoustical velocity in the fluid medium. More specifically, the circuitry of FIG. 5 normalizes the gating interval to render the docking system of FIGS. 2 through 5 operative and accurate for any medium propagation characteristic.

An oscillator 510 supplies a sinusoidal output to a mixer 520, with a second input for the mixer comprising the output of a voltage controlled oscillator 518. Variable resistors 514 and 516 are employed to vary the control voltage input to the voltage controlled oscillator and, thereby also, to vary its output frequency. The variable resistors 514 and 516 may be manually operated by dialing in measured or known temperature and salinity values or, alternatively, these resistors may comprise transducers having impedances or output voltages which vary with parameters actually sensed. Further, the input of the voltage controlled oscillator may be derived from a velocimeter which directly supplies an output voltage which varies with the acoustical propagating speed of the ocean.

The mixer 520, operative in conjunction with a low-pass filter 522, produces a sinusoidal output voltage having a frequency which has a nominal value to give rise to the normal gating interval (e.g., 1 second) after further processing, but which has a frequency correction to account for deviations in the ocean propagation characteristic from a predetermined norm. A squaring circuit 524 converts this extracted sinusoidal signal to digital form, and the resulting square wave signal passes to a scaling, or pulse dividing network 526. The scaler 526 reduces the pulse repetition rate to the desired corrected gating interval, e.g., approximately 1 second. That is, the output from the scaling circuit 526 is adapted to comprise an output pulse which sets a flip-flop 528 about once each second acting through a differentiator 529.

The zero output terminal of the flip-flop 528 returns to a low voltage condition when the flip-flop becomes set, thereby generating a negative going transient which triggers a one-shot multivibrator 533 for producing one pulse each second which is slightly delayed from the output of the scaler 526. This output pulse, illustratively comprising a transition from a low voltage, to a relatively high voltage and back again, gives rise to two independent circuit operations. First, this pulse is supplied to the latched memories 418 (FIG. 4) and 340 (FIG. 3) to operate these memories in a track or sample mode. While tracking, the memories attain and internally store the digital values of the input signals supplied thereto, with these stored signals being present at the output of the memories 340 and 418. When the "sample" output pulse from the one-shot multivibrator 533 terminates, the memories 340 and 418 are returned to their normal hold state, with the signals stored during the sampling interval being retained at the output of the memories until the next sample level pulse is received.

The output from the one-shot multivibrator is also supplied to an additional delay producing one-shot multivibrator 530 which produces a CLEAR output pulse a fixed time after the sample level pulse has been produced. This CLEAR pulse resets the flip-flop 528 until the next following gating pulse is received from the scaler 526; resets the flip-flops 328 and 330; and resets the velocity magnitude counter 416 to initiate a new axial velocity measuring operation.

The velocity measurement stored in the memory 418 (velocity magnitude but not direction) at the end of each cyclic sampling interval is displayed by a plurality of decade displays $426_1$ through $426_n$ which may be disposed at various positions about the ship, i.e., in the control room, on the bridge, and elsewhere. The output from the memory 418 is supplied to a plurality of decoder-drivers 420 which perform a data conversion function which depends upon the requirements of the displays 426. The decoder-drivers 420 are well known to those skilled in the art and may comprise, for example, apparatus for converting binary coded decimal information to lamp display driving one out of seven or one out of 10 codes. The latched memory 340 gives rise to the requisite directional information by illuminating either one of the lamp groups 352 or 354 to respectively indicate whether the ship is heading fore or aft.

With the above-described circuitry in mind, an illustrative sequence of circuit operation for the docking system of FIGS. 2—5 will now be described in conjunction with the above-considered fore-aft motion channel which is typical of all other channels. The oscillator 210 supplies energy to the transmitter 203 via the amplifier 212. This relatively high frequency information is emitted forward and downward, and a portion of the emitted energy is reflected to and recovered by the receiving transducer 201.

Also, the fixed and voltage controlled oscillators 510 and 518 generate recurring velocity measuring interval gating pulses which, after digital processing, are produced at the output of the one-shot circuit 533. The mixer 520 receives the output of the oscillator 510 and the output of the voltage controlled oscillator 518 which effects a salinity and temperature water propagation speed correction, and the selected first order mixer output frequency is converted to digital form by the squaring circuit 524. The frequency output of the squaring circuit 524 is divided down by the scaler 526 which repetitively sets the flip-flop 528 at approximate 1-second intervals corrected for variations in the ocean wave propagation speed. The negative voltage transients at the "0" output of the flip-flop 528 are coupled to the one shot multivibrator 533 which responds thereto by supplying positive going data sampling pulses having a relatively short time duration and a repetition rate of approximately 1 cycle per second. The sampling pulses are supplied to the latched memories 340 and 418 to temporarily operate these memories in the sample mode, quickly returning to the normal hold mode. Thus, the latched memory 340 samples directional information (fore or aft) approximately once each second and, coincidentally therewith, the memory 418 stores the velocity magnitude information manifested by the contents of the counter 416.

The velocity directional and magnitude information is developed by mixing the emitted signal and the Doppler frequency shifted signal developed by the transducer 201, both without phase shift in the mixer 216 and with 90° relative phase shift in the mixer 218. The like Doppler difference frequency outputs from the mixers 216 and 218 are converted to digital form by squaring circuits 226 and 230, and the resulting square wave outputs, having a 90° phase shift therebetween are supplied to the circuitry 309 for substantially determining direction information. This directional identification is accomplished by steering the Doppler difference frequency to the output of the AND gate 320 if the ship is moving forward, or to the output of the AND gate 322 if the ship is moving astern. This signal steering, in turn, is effected by sampling the phase shifted square wave output of the circuit 230 during a fixed point of each reference square wave, the gate 312 being operative to set the flip-flop 318 if the ship is moving forward (the phase shifted output of the circuit 230 being positive during the critical sampling instant). Alternatively, the gate 316 resets the flip-flop 318 (the output of circuit 230 being negative at the critical sampling instant) if the ship is moving astern. The AND gate 320 passes delayed pulses, corresponding in frequency to the Doppler difference frequency, through the AND gate 320 after the flip-flop 318 is set (a high voltage on the flip-flop "1" output terminal) and the gate 322 passes this Doppler difference frequency information if the "0" output of flip-flop 318 exhibits a relatively high output voltage.

Circuitry 323 verifies that two consecutive forward motion indicating pulses or two consecutive rearward indicating pulses are received and, responsive to one of these conditions obtaining, locks up the circuitry 323 for the duration of the sampling cycle. If the vessel is identified as going forward, a gate 332 is continuously enabled to pass velocity metering pulses for measurement via the OR gate 336. If the boat is moving astern, the AND gate 334 passes the difference frequency information through OR gate 336.

Both of the gates 332 and 334 are initially enabled by the "0" outputs of the flip-flops 328 and 330 at the beginning of a velocity measuring cycle. Similarly, the AND gates 323 and 325 are normally enabled by the "0" outputs of these flip-flops. When two consecutive inputs are impressed on one of the leads to the verifier circuit 323, the corresponding counting flip-flop 324 or 326 sets an associated flip-flop 328 or 330, thereby impressing a low voltage at the "0" output of the flip-flop. This low flip-flop "0" output voltage disables one of the AND gates 332 and 334 and disables a corresponding one of the AND gates 323 or 325 to isolate and block any spurious pulses indicative of motion opposite to the actual direction of travel of the vessel.

The flip-flop 328 is set (a high "1" output voltage) if the vessel is moving forward and the flip-flop 330 is set if the vessel is moving astern. The memory 340 examines these flip-flops during the critical sampling interval, and between sampling times, illuminates the lamp group 352 or the group 354 to indicate that the vessel was detected as moving either forward or astern during the most recent sampling interval.

The pulses at the output of the OR gate 336, indicative of velocity magnitude but not direction, are normally passed through the AND gate 410 and are divided down by the scaler 412. The capacity of the scaler 412 is adjusted by particular settings of the switches 414 such that the output of the scaler supplied pulses having a significance measured by a standard engineering unit. For example, if a Doppler difference frequency of 300 cycles per second corresponds to a forward speed of 1 knot, the scaler might advantageously have a capacity of 30 states to divide the input pulses by a factor of 30, such that each output pulse supplied to the counter 416 represents a velocity for the normal 1-second gating interval of one-tenth of a knot. The switches, which might be more than one in number, can make several adjustments. For example, the scaling factor may be changed to vary the significance of each output pulse from one-tenth of a knot to 1 foot per second. Alternatively, the capacity could be changed to effect a division by three such that each output pulse would identify 100th of a knot.

The output pulses which occur during the approximate 1-second gating interval since the counter 416 was reset by the last CLEAR pulse are successively stored in the counter 416. The counter 416 is normally disconnected from the displays, since the "hold" level control signal output of multivibrator 533 constrains the latched memory 418 to present to the decoder drivers 420 only the velocity information derived during the last sampling interval. At the end of the approximate 1-second gating interval, the control input of the memory 418 momentarily changes to the sample mode and the contents of the counter 416 are registered in the latched memory 418. At this time, the relatively low sample/hold control signal blocks the AND gate 410 from passing any further velocity augmenting pulses. The latched control then returns to its normal hold state when the one-shot multivibrator 533 times out, and the contents of the counter 416, directly indicative of the velocity component under study, is decoded and displayed by the units 426.

Shortly after the sample/hold signal returns to normal, a CLEAR pulse is developed by the one-shot multivibrator 530 which clears the above-enumerated flip-flops and the counter 416 to initiate a new velocity measuring operation. In the gating interval between sampling pulses, the velocity direction and magnitude last computed are displayed by the lights 352 or 354, and the displays 426.

Thus, the above-described digital data processing apparatus has been shown by the above to reliably measure and display the direction and magnitude of ship's velocity along its fore-aft axis. Circuitry identical to that described above is included in control and display circuit channels 250 and 260 for respectively computing and displaying a ship's port-starboard velocity at the bow and stern.

It is to be understood that the above-described arrangement is only illustrative of the principles of the present invention. Numerous modifications and adaptations thereof will be readily apparent to those skilled in the art without departing from the spirit and scope of the present invention. For example, energy can be transmitted downward and outward in both directions along a given axis, and the inverse frequency shifted return signals beat together in the mixers 216 and 218. This essentially doubles the output Doppler difference frequency, hence increasing system resolution and accuracy, and offsetting pitch and roll effects (not normally a problem for docking applications).

What I claim is:

1. In combination in a docking system, transmitting transducer means for radiating emitted energy downward and outward along a desired sensing axis, receiving transducer means for recovering a returned portion of said emitted energy, said returned energy portion having a frequency dependent upon the speed of said transducers along said sensed axis, means for generating first and second digital square wave signals each having a frequency reflecting the difference in frequency between the emitted and returned signals and having a relative phase dependent upon the direction of motion of said transducers along said axis, means for sampling said second square wave signal during a predetermined point in the cycle of said first square wave signal, means responsive to the output of said sampling means for presenting information identifying the relative direction of said transducers along said sensing axis, means for developing a sequential pulse train dependent in frequency upon the frequency of one of said square waves, digital counter means for counting the pulses produced by said pulse developing means, information outputting means, latching memory means for operating said information outputting means in accordance with the contents of said counter during a sampling interval, and time gate means for periodically initializing said counter to a reference state and for periodically supplying control signals to said latching memory means.

2. A combination as in claim 1 wherein said time gate means includes means for varying said counter initializing periodicity and said control signal supplying periodicity responsive to variations in the acoustical propagating characteristic of the emitted energy propagating medium.

3. A combination as in claim 2 wherein said time gate means includes a reference oscillator, means for supplying a signal having a frequency dependent upon the acoustical propagating characteristic of the wave propagating medium, mixer and filter means for obtaining an output signal dependent upon the difference in frequency between the output of said reference oscillator and the output of said propagation characteristic dependent signal supplying means, and scaler means for periodically supplying pulses responsive to a plurality of input oscillation cycles supplied thereto by the output of said mixer and filter means.

4. A combination as in claim 3 wherein said time gate means further includes a flip-flop connected to said scaler means, said scaler means being adapted to selectively set said flip-flop, and delay means connected to an output of said flip-flop for resetting said flip-flop.

5. A combination as in claim 1 wherein said first and second digital square wave generating means comprise first and second mixer and filter means, squaring circuit means connected to the output of each of said input filters, means for supplying said emitted and returned signals to said first and second mixer and filter means, and means connected at the input of said second mixer and filter for producing a 90° relative phase shift between said emitted and said returned signals.

6. A combination as in claim 1 further comprising scaler means connected intermediate said digital counter means and said pulse developing means.

7. A combination as in claim 6 further comprising switching means for varying the pulse frequency division factor for said scaler means.

8. A combination as in claim 1 wherein said second square wave sampling means includes means for generating an output pulse responsive to a voltage transient condition for said first square wave signal, first and second AND gates each having two inputs, said voltage transient responsive pulse being supplied to one input of each of said AND gates, means for supplying said second square wave in inverted relationships to a second input of said first and second AND gates, an output from one of said AND gates signaling motion in one direction along said sensing axis and an output from the other of said AND gates signaling motion in the other direction along said sensing axis.

9. A combination as in claim 8 wherein said sampling means further comprises third and fourth AND gates, means for supplying one of said square wave signals to each of said third and fourth AND gates, a flip-flop selectively set by said first AND gate and selectively reset by said second AND gate, one output from said flip-flop being connected to said third AND gate and the other output of said flip-flop being connected to said fourth AND gate.

10. A combination as in claim 9 wherein said relative direction identifying means comprises verifier means for signaling the relative direction only after the incidence of a plurality of pulses corresponding to motion in a like direction.

11. A combination as in claim 10 wherein said verifier means includes first and second additional counting means respectively connected to said third and fourth AND gates, first and second verifier flip-flops selectively set by said first and second additional counters, additional latched memory means for developing a relative direction display dependent upon the relative states of said verifier flip-flops, and means for periodically disabling said verifier circuit for further change after one of said verifier flip-flops is set.

12. A combination as in claim 1 wherein said information outputting means comprises at least one decade display, and at least one decoder-driver means responsive to the output of said latching memory means for selectively activating said decade display.

13. A combination as in claim 1 further comprising additional receiving and transmitting transducers for producing relative frequency signals indicative of motion along at least one additional sensing axis, and means connected to said transducers for computing and displaying the direction and magnitude of motion along said additional sensing axis.

14. A combination as in claim 1 further comprising means for audibly reproducing one of said square wave signals.

15. In combination in a docking system, transmitting transducer means for radiating emitted energy downward and outward along a desired sensing axis, receiving transducer means for recovering a returned portion of said emitted energy, said returned energy portion having a frequency dependence upon the speed of said transducers along said sensing axis, means responsive to said radiated and returned energy for determining the direction of motion of said transducers along said sensing axis, means for producing a pulse train having a repetition rate dependent upon the difference in frequency between said transmitted and returned signals, scaler means for reducing the frequency of said pulse train in accordance with an engineering unit of interest, counter means cycled by said scaler means, gating means for periodically resetting said counter means, and means for displaying the highest count attained by said counter means, said counter resetting gating means including means for periodically resetting said counter at a repetition rate dependent upon the acoustical propagation characteristic of the radiated and returned energy propagating medium.

16. A combination as in claim 15 wherein said counter resetting gating means includes means for varying the frequency of said resetting signals in accordance with the salinity and temperature of the propagating medium.

17. A combination as in claim 15 wherein said counter resetting gating means includes a voltage controlled oscillator having an output signal which varies in frequency with the acoustical propagation characteristic of the propagating medium, a reference oscillator, mixer and filter means for developing a frequency dependent upon the difference in frequency between the output of said reference oscillator and the output of said voltage controlled oscillator, and additional scaling means for reducing the frequency of the output signal developed by said mixer and filter means.

UNITED STATES PATENT OFFICE
CERTIFICATE OF CORRECTION

Patent No. 3,594,716                    Dated July 20, 1971

Inventor(s)  Glenn N. Waterman

It is certified that error appears in the above-identified patent and that said Letters Patent are hereby corrected as shown below:

Column 3, line 52, "GATE" should read -- gate --; line 61, "multivibraotor" should read -- multivibrator --. Column 7, line 58, "and", first occurrence, should read -- or --.

Signed and sealed this 27th day of June 1972.

(SEAL)
Attest:

EDWARD M. FLETCHER, JR.           ROBERT GOTTSCHALK
Attesting Officer                 Commissioner of Patents